United States Patent [19]

Knowles et al.

[11] 4,119,085

[45] Oct. 10, 1978

[54] SOLAR ENERGY COLLECTOR

[75] Inventors: Gregory W. Knowles, Huntington; Odd E. Sangesland, Plainview; Henry J. Vroom, Commack; Robert W. Madey, Huntington Station, all of N.Y.

[73] Assignee: Grumman Aerospace Corporation, Bethpage, N.Y.

[21] Appl. No.: 810,111

[22] Filed: Jun. 27, 1977

Related U.S. Application Data

[62] Division of Ser. No. 615,461, Sep. 22, 1975, Pat. No. 4,059,093.

[51] Int. Cl.[2] .............................................. F24J 3/02
[52] U.S. Cl. .................................... 126/271; 237/1 A; 165/105
[58] Field of Search ................. 126/270, 271; 60/641; 165/105; 237/1 A

[56] References Cited

U.S. PATENT DOCUMENTS

| | | | |
|---|---|---|---|
| 1,661,473 | 3/1928 | Goddard et al. | 126/271 |
| 1,802,635 | 4/1931 | Eaton | 126/271 |
| 3,018,087 | 1/1962 | Steele | 126/271 X |
| 3,118,437 | 1/1964 | Hunt | 126/270 |
| 3,125,091 | 3/1964 | Sleeper | 126/271 |
| 3,203,167 | 8/1965 | Green, Jr. | 60/641 |
| 3,227,153 | 1/1966 | Godel et al. | 126/271 |
| 3,262,493 | 7/1966 | Hervey | 126/271 X |
| 3,310,102 | 3/1967 | Trombe | 165/105 X |
| 3,321,012 | 5/1967 | Hervey | 126/271 X |
| 3,369,540 | 2/1968 | Meckler | 126/271 |
| 3,599,626 | 8/1971 | Bouse | 126/271 |
| 3,602,429 | 8/1971 | Levedahl et al. | 165/105 X |
| 3,643,648 | 2/1972 | Tarcici | 126/270 |
| 3,746,081 | 7/1973 | Corman et al. | 165/105 X |
| 3,779,310 | 12/1973 | Russell | 165/105 X |
| 3,788,388 | 1/1974 | Barkmann | 165/105 |
| 3,799,144 | 3/1974 | Ramsey et al. | 165/105 |
| 3,828,845 | 8/1974 | Waters | 165/105 |
| 3,875,926 | 4/1975 | Frank | 165/105 |
| 3,915,147 | 10/1975 | Rineer | 126/271 |
| 3,923,038 | 12/1975 | Cutchaw | 126/271 |
| 3,923,039 | 12/1975 | Falbel | 126/271 |

Primary Examiner—Kenneth W. Sprague
Attorney, Agent, or Firm—Morgan, Finnegan, Pine, Foley & Lee

[57] ABSTRACT

A solar energy collector for collecting, concentrating, and utilizing solar energy, including a target for transferring solar energy into another useable energy form and reflector positioned to increase the amount of solar energy reaching the target and prevent solar energy from escaping around the target, the target including in its preferred form a transparent envelope and a heat pipe containing a heat transfer fluid, the heat pipe having an evaporator portion disposed within the transparent envelope and an emergent condenser portion with a flange forming a dry thermal interface with a manifold for conducting heat energy directly from the heat pipe to the manifold.

5 Claims, 17 Drawing Figures

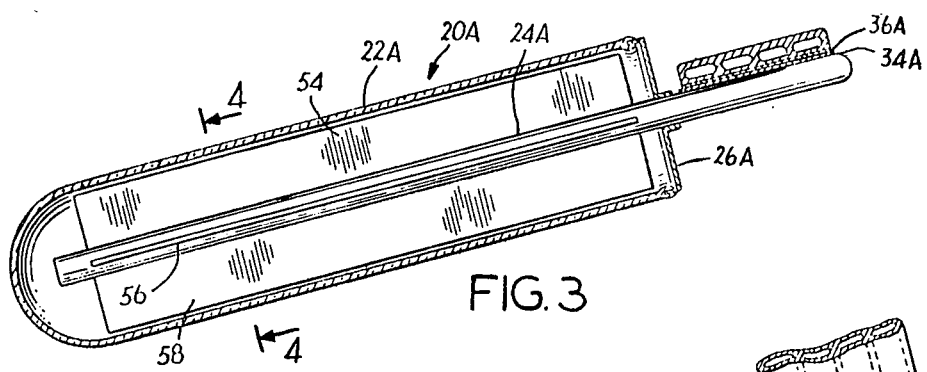
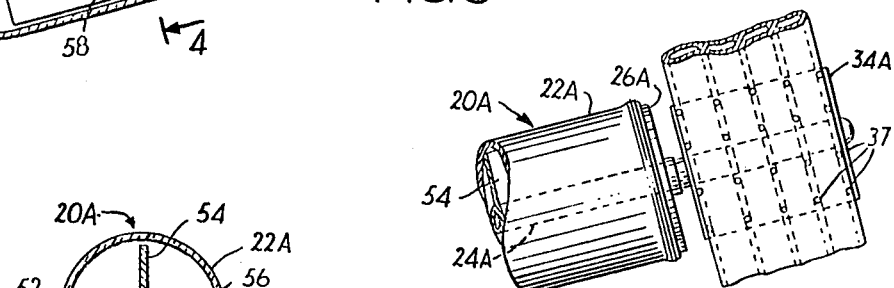
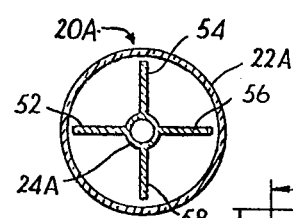
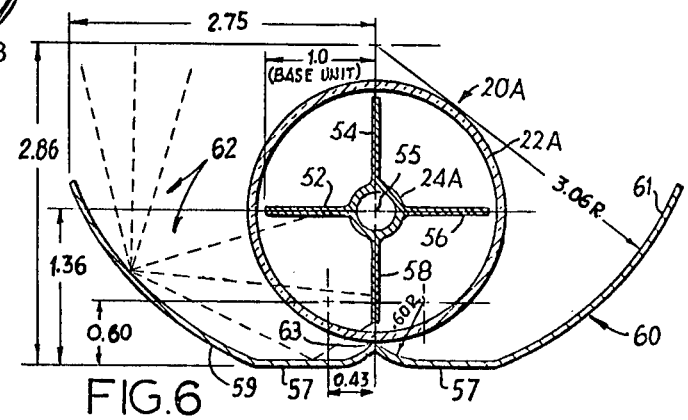
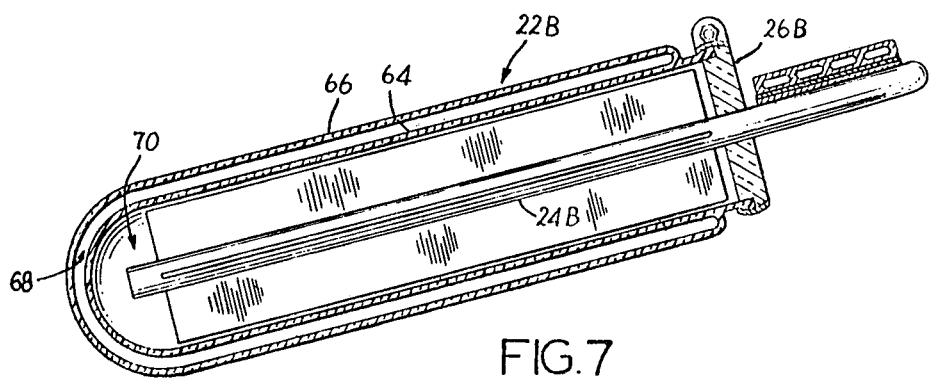

SOLAR ENERGY COLLECTOR

This is a division, of application Ser. No. 615,461 filed Sept. 22, 1975, now U.S. Pat. No. 4,059,093.

The present invention relates to solar energy collectors, and more specifically to a solar energy collector including a target in the form of a heat pipe and novel eflectors for collecting solar energy. Generally, a heat pipe may be defined as a closed container housing a vaporizable liquid as the heat transfer medium. The heat transfer medium is evaporated at one location by absorption of heat and condensed at another location by the extraction of heat. The condensed liquid is returned to the heat absorption portion, e.g., via a wick. Heat pipes per se are well known in the art, see for example, U.S. Pat. No. 3,229,759; 3,435,889; 3,602,429 and 3,746,081.

Various solar energy collector constructions are known in the art. U.S. Pat. No. 1,802,635 discloses a solar water heater having a flat plate collector. U.S. Pat. No. 3,125,091 discloses an inflatable pipe solar energy collector. U.S. Pat. No. 3,203,167 discloses a system for concentrating solar energy on a slit in an opaque cylinder. U.S. Pat. No. 3,262,493 discloses a system for collecting and storing solar heat within the earth for future use. U.S. Pat. No. 3,321,012 discloses an array of flattened tubes with semi-cylindrical reflectors.

A recognized problem in attaining widespread commercial use of solar energy to provide heat and power has been the cost of collecting the energy. To minimize such costs stationary approaches were considered using evacuated tubes with solar energy absorbing means therein. Solar energy collectors were then developed having a troughlike reflecting wall capable of accepting solar radiation over a limited period of time and redirecting all that was accepted to a target for complete utilization thereof. In such improvements it was believed necessary to develop a cylindrical reflector whose surfaces were parabolic in shape and spanned the target so that the focal point of the parabolic surfaces was at the opposite edges of the target.

Moreover, known solar energy collectors generally include tubes through which a fluid flows as the intermediate heat transfer medium. When installing an array of such collectors on a roof, a multiplicity of fluid connections must be made at the site, causing an increase in installation cost and risk of leakage.

It is an object of the present invention to expand the period of time that a solar energy collector may be effectively used without increasing its cost.

It is an object of the present invention to provide an improved solar energy collector incorporating a low temperature heat pipe for heating buildings and the like.

It is a further object of the present invention to provide an improved solar energy collector having a dry thermal interface for transferring heat to a manifold.

It is a still further object of the present invention to provide a highly efficient solar energy collector.

It is a still further object of the present invention to provide a solar energy collector which may be readily mounted on a manifold without the need to make a large number of fluid connections.

It is a still further object of the present invention to provide solar energy collectors which can be easily installed at the site, and removed and replaced, as warranted.

It is a still further object of the present invention to provide improved reflectors for collecting solar energy.

It is a still further object of the present invention to eliminate the need for apparatus to mobilize a collector and/or reflector by use of a novel reflector design for accommodating broader operating conditions.

It is a still further object of the present invention to provide a novel fixed reflector construction having its surfaces shaped so as to capture and reflect solar energy between low and high incidence and all intermediate angles of incidence.

It is a still further object of the present invention combine with a target, such as a heat pipe, a gull-wing shaped reflector to ensure reflection of solar energy to the target.

Other objects, aspects, and advantages of the present invention will be apparent when the detailed description is considered with the drawings.

Briefly, the solar energy collector of the present invention includes a transparent envelope and a heat pipe containing a heat transfer fluid, the heat pipe includes an evaporatoι portion disposed within the transparent envelope and an emergent condenser portion with a flange forming a dry thermal interface with a manifold for conducting heat energy from the heat pipe to the manifold. Novel reflectors for collecting solar energy are also described for use over a wider latitude of sun angles than heretofore considered possible with fixed apparatus. Prior to the instant invention those skilled in the art considered that a stationary solar energy collector would only have limited effectiveness and that it was necessary to provide means to track the sun with the collector or in some cases with a collector-reflector combination in order to sufficiently increase the amount of solar energy directed to the collector.

The present invention is illustrated in the accompanying drawings, in which:

FIG. 3 is a side view in partial section of another embodiment of the solar energy collector;

FIG. 4 is a sectional view taken along lines 4—4 of FIG. 3;

FIG. 5 is a partial top plan view of the solar energy collector of FIG. 3;

FIG. 6 is a sectional view of a solar energy collector, including a novel gull-wing shaped reflector positioned below the transparent envelope;

FIG. 7 is a side view in partial section of another embodiment of the solar energy collector;

Figure 1:
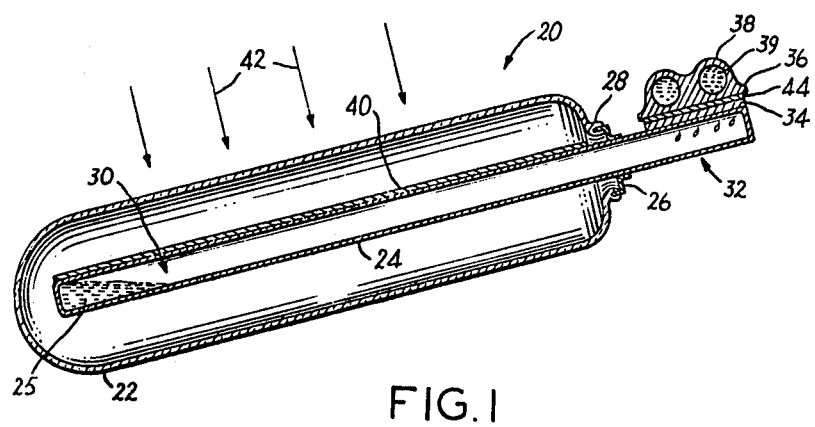
FIG. 1 is a cross-sectional view of one embodiment of the solar energy collector.

Referring to FIG. 1, the solar energy collector of the present invention is illustrated generally at 20. The collector 20 includes a transparent envelope or container 22, e.g., of glass or plastic, and a metal heat pipe 24 disposed therein, containing a conventional heat transfer fluid, e.g., acetone.

A preferred heat pipe 24 is the type disclosed in application Ser. No. 519,788, filed Oct. 21, 1974, and assigned to the same assignee as the instant application. The heat pipe 24 extends through a closure member or glass-to-metal seal 26 positioned at the open end of the container 22. The heat pipe 24 includes an evaporator portion 30 and an emergent condenser portion 32. A flattened metal member or flange 34 is affixed to the emergent condenser portion 32 of the heat pipe 24.

The flange 34 is tightly coupled to a mating metal member 36 on a fluid conduit or manifold 38. A fluid 39, e.g., a mixture of water and ethylene glycol or other antifreeze mixture is continuously circulated through the manifold 38. The flattened member 34 and mating member 36 are tightly held together by bolts 37, see FIG. 5. However, it should be understood that other clamps or fastening means may also be employed. The tight metal-to-metal contact between the flattened member 34 and mating member 36 provides heat transfer which may be enhanced, as desired, by grease or a grease-like material of high thermal conductivity, e.g., a silicone grease.

Advantageously, the heat pipe 24 includes a heat absorbing coating 40, e.g., black paint or a selective coating of the type described in U.S. Pat. No. 2,917,817 (Tabor). However, it should be understood that the heat absorbent coating is not limited to this type. The transparent container 22 is evacuated to an internal pressure of $10^{-4}$ mm. of mercury, or less, to provide thermal insulation for substantially eliminating convection and conduction losses from the heat absorbent coating 40. The heat pipe 24 is positioned in the path of the incident solar radiation generally indicated at 42.

In operation, incident solar radiation 42 is transmitted through the transparent container 22 to the radiation absorbent coating 40 where the radiant energy is converted into heat and conducted directly to the evaporator portion 30 of the heat pipe 24. This heat causes evaporation of the heat transfer fluid 25. The vapor flows toward the condenser portion 32 of the heat pipe 24 where it condenses, giving up heat to the manifold 38 through a dry thermal interface 44 between the flange 34 and mating member 36. The condensed heat transfer fluid 25 flows by wick or by gravity back to the evaporator portion 30 where the cycle is continuously repeated. The heat pipe 24 and dry thermal interface 44 provide a highly efficient heat transfer path between the radiation absorbent coating 40 and the manifold 38.

Figure 2:
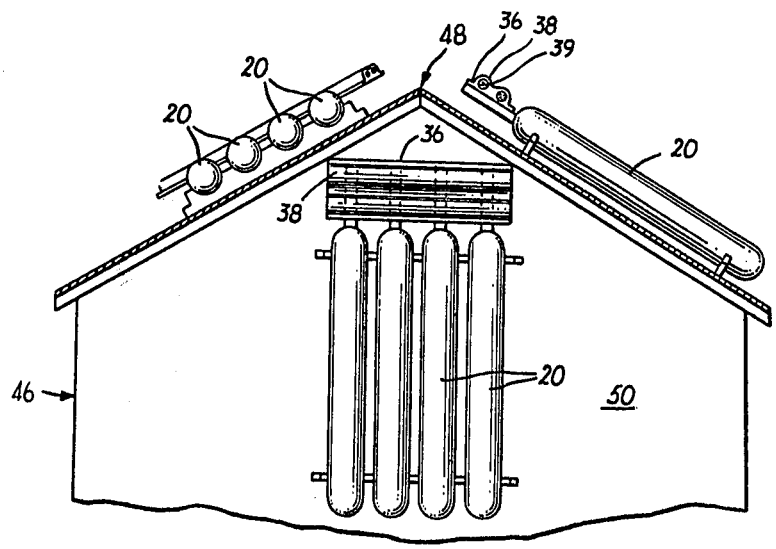
FIG. 2 is an end view of a building showing various possible arrangements for mounting solar energy collector arrays thereon.

FIG. 2 illustrates various configurations for mounting an array of solar energy collectors 20 on a building 46. When mounted on the roof 48, the longitudinal axis of the collectors 20 may be arranged transversely to or in the same same direction as the logitudinal axis of the roof 48. If mounted on the exterior wall 50 of the building 46, the collectors 20 may be oriented vertically.

Referring to FIGS. 3, 4, and 5, the collector 20A includes a heat pipe 24A having four absorbing fins 52, 54, 56 and 58 extending outwardly therefrom. The absorbing fins 52, 54, 56 and 58 are of substantially equal size and extended to a position adjacent the inner wall of the transparent container 22A. Advantageously, the absorber fins 52, 54, 56 and 58 are coated with a heat absorbent coating like that shown in FIG. 1. A metal-to-glass seal 26A is provided at the open end of the glass container 22A to maintain vacuum integrity and the flattened portion 34A of the emergent end of the heat pipe 24A is mounted on the mating portion 36A of a manifold 38A with suitable fastening means such as bolts 37.

Figure 9:
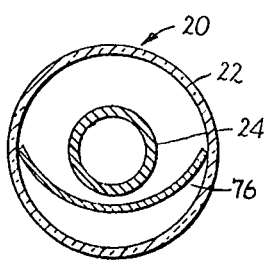
Figure 10:
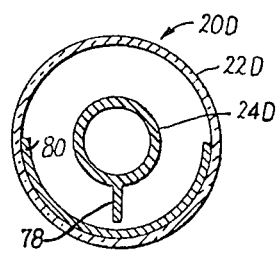
Figure 11:
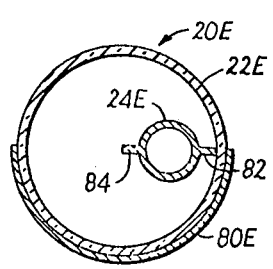
Figure 13:
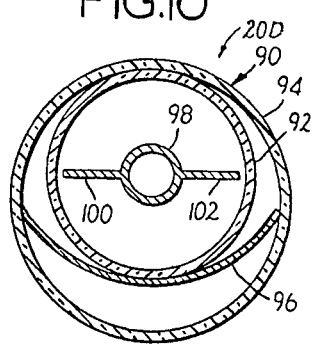
Figure 14:
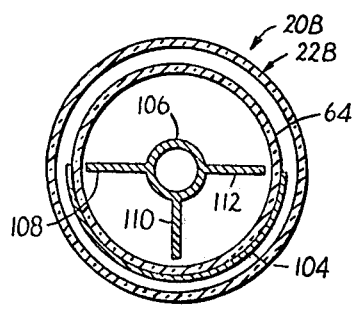
Figure 15:
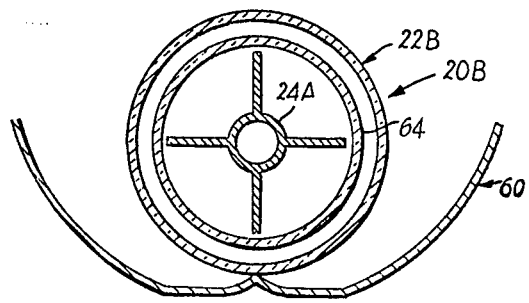
Figure 16:
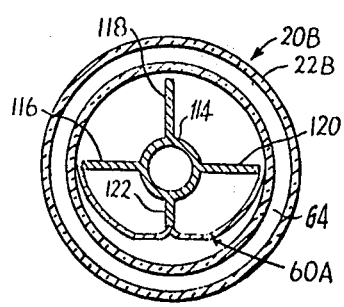

Referring to FIG. 6, the solar energy collector 20A advantageously includes an novel inverted elongate gull-wing shaped reflector 60 positioned externally of the transparent container 22A and extending along its length for reflecting incident solar energy indicated by the dash-lines 62 and focusing it on the finned heat pipe 24A. Reflector 60 may be made of metal or of a transparent material having reflective material embedded therein. An advantage of the latter construction is that the reflector 60 permits partial reflection and partial transmission. As shown in FIG. 6, the incident solar energy 62 does not pass around the reflector 60, but due to the novel cross-sectional shape, is redirected to the target, or heat pipe 24A. The gull-wing shape of the reflector 60 can be provided by involute curves. The gull-wing shaped reflector 60 is generally positioned at the center line of the angle of maximum incident energy on the heat pipe 24A, e.g., the vertical line through fins 54 and 58. It should be understood that the reflector 60 could also be formed of planar surfaces, hyperboloid surfaces, paraboloid surfaces, and surfaces of revolution which intersect at a central point or apex of the reflector 60. The reflector 60 increases the amount of solar energy focused on the finned heat pipe 24A by concentrating the solar energy from an area wider than the heat pipe 24A. Specifically, the reflector 60 is shaped to direct solar energy to the entire surface of the finned heat pipe 24A, even the surface area below lateral fins 52 and 56 which is not in the direct path of the solar energy. Other reflectors and their location will be described with reference to FIGS. 9, 10, 11, 13, 14, 15 and 16. Specifically, the reflectors may be positioned externally of the transparent container as shown in FIGS. 6, 11 and 15, within the transparent container as shown in FIGS. 9, 10 and 16, and between the walls of a double-wall transparent container 22B as shown in FIGS. 13 and 14.

With specific reference to the embodiment shown in FIG. 6, the reflector 60 is bilaterally symmetrical and shaped so that nearly all of the incident solar energy is reflected to impinge on the heat pipe 24A. Specifically, considering the distance from the center 55 of the heat pipe 24A to the extremity of one of the fins 52, 54, 56, or 58 as unity, the central portion 57 of the reflector 60 is located at a distance of 1.36 units from the center 55 of the heat pipe 24A. The outer portions 59 and 61 of the reflector 60 are in the form of curved surfaces having a radius of 3.06 units from a common center located on the axis of symmetry a distance of 2.86 units above the central portion 57 of the reflector 60. The curved surfaces 59 and 61 extend from the central portion to imaginary lines 2.75 units from the axis of symmetry. The center of the central portion 57 of the reflector 60 is curved upwardly to form a cusp 63. The cusp 63 is formed by intersecting arcs having radii of 0.6 units and centers located 0.43 units on opposite sides of the axis of symmetry 0.6 units above the central portion 57.

Referring to FIG. 7, a double-wall transparent container 22B is shown, including an inner wall 64 and a spaced outer wall 66 forming an annular space 68 therebetween. The annular space 68 is evacuated and the interior space 70 within the inner wall 64 of the transparent container 22B is not evacuated. A closure member 26B, e.g., of cork, plastic, and the like, is positioned at the open end of the transparent container 22B to provide support and insulation for the heat pipe 24B.

Figure 8:
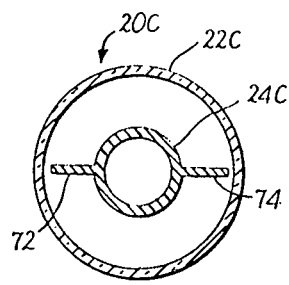
FIGS. 8–16 are cross-sectional views of other embodiments for the solar energy collector.

Referring to FIG. 8, a heat pipe 24C is shown centrally positioned within a transparent container 22C and having a pair of horizontally absorbing fins 72 and 74 of substantially equal size.

Referring to FIG. 9, a metal reflector 76 is positioned within the transparent container 22 of the collector 20 shown in FIG. 1.

Referring to FIG. 10, another solar energy collector 20D is illustrated in which the heat pipe 24D includes a single vertical fin 78 extending downwardly to a position adjacent the interior surface of the transparent container 22D. The lower half of the interior surface of the transparent container 22D includes a reflective coating or silvering 80 to focus solar energy incident thereon onto the heat pipe 24D or its fin 78.

Referring to FIG. 11, another solar energy collector 20E is illustrated in which the transparent container 22E includes a reflective coating or silvering 80E on its exterior surface. The heat pipe 24E is eccentrically mounted within the transparent container 22E and includes a pair of horizontal fins 82 and 84 of substantially equal size extending from a position adjacent to the interior surface of the transparent container 22E to the center thereof.

Figure 12:
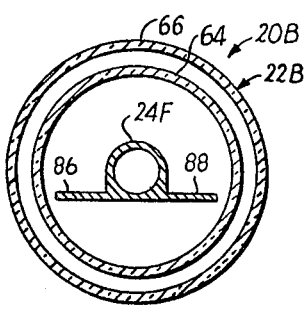

Referring to FIG. 12, a solar energy collector 20B having a double-wall transparent container 22B is illustrated in which the heat pipe 24F includes horizontal fins 86 and 88 which are off center. The fins 86 and 88 extend outwardly from the exterior surface of the heat pipe 24F to a position adjacent the interior of the inner wall 64.

Referring to FIG. 13, a solar energy collector 20D having an eccentric double-wall transparent container 90 is illustrated. The inner wall 92 is eccentric relative to the outer wall 94 and the evacuated space therebetween is sufficient to accommodate a metal reflector 96. The heat pipe 98 includes a pair of horizontal fins 100 and 102 which are of substantially equal size and extend to a position adjacent the interior surface of the inside wall 92.

Referring to FIG. 14, a solar energy collector 20B having a double-walled container 22B is illustrated with silvering 104 on the lower half of the exterior surface of the inside wall 64. The heat pipe 106 includes three fins 108, 110 and 112 of substantially equal size which extend outwardly from the exterior surface of the heat pipe 106 to a position adjacent the interior surface of the inside wall 64.

Referring to FIG. 15, a solar energy collector 20B having a double-walled container 22B is illustrated with a gull-wing shaped reflector 60 positioned below the container 22B and the cusp 63 of the reflector 60 positioned on the vertical axis of the heat pipe 24A which corresponds to the sun angle of maximum incident energy on the heat pipe 24A. The heat pipe 24A is of the same configuration as that shown in FIG. 6.

Referring to FIG. 16, another double-wall transparent container 22B is illustrated. The heat pipe 114 includes four equally spaced fins 116, 118, 120 and 122. Fins 116, 118 and 120 are of substantially equal size. Downwardly extending fin 122 is of reduced size to accommodate a gull-wing shaped metal reflector 60A positioned within the interior of the container 22B so that its ends contact the interior surface of the inside wall 64.

Figure 17:
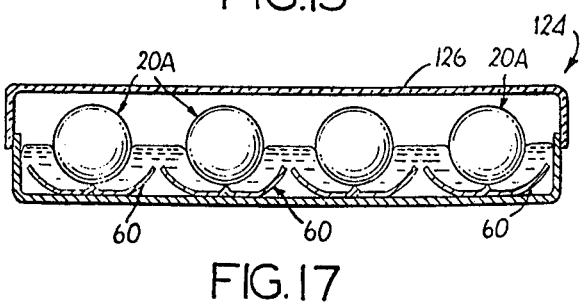
FIG. 17 is an end view in partial section of a housing for an array of solar energy collectors.

Referring to FIG. 17, an array of collectors 20A are shown housed within a protective housing 124 having a transparent protective cover 126 which may be made of glass, plastic, or the like. The cover 126 protects the array from damage from the elements, e.g., hail, prevents accumulation of dirt and debris on or around the collectors 20A, and aids in reducing heat losses. The collectors 20A include gull-wing shaped reflectors 60; however, it should be understood that the reflectors 60 may be eliminated, if desired.

The aforedescribed solar energy collectors should be considered as illustrative. Representative embodiments have been illustrated in the drawings; however, it should be apparent that reflective coatings may be used on the interior and exterior surfaces of the collectors, the heat pipes may include various fin configurations, and the metal reflectors may assume various configurations, symmetrical as well as asymmetrical, and be positioned within or without the transparent container, as desired.

What is claimed is:

1. A solar energy collection system comprising:
   (a) an elongated, evacuated, substantially cylindrical envelope of transparent material having an orifice at one end thereof, said envelope having at least two walls, the space between said walls also being evacuated;
   (b) an elongated, substantially cylindrical, sealed container mounted within said envelope, one end of said container projecting through said orifice via an air-tight seal, said container being disposed at an angle with respect to horizontal, said end projecting through said envelope being located at the higher elevation;
   (c) a vaporizeable liquid located within said container and concentrated at the lower elevation thereof, said fluid, upon vaporization, progressing toward the higher elevation of said container where said vapor gives up heat and condensation takes place;
   (d) a plurality of axially-aligned, fin-like structures attached to and projecting from said container for enhancing the heat absorption of said container;
   (e) a reflector located below said container and extending for a substantial portion of the length of said container for receiving and reflecting incident solar radiation from an area wider than said container and for concentrating said radiation on said container;
   (f) a first substantially planar conductive member affixed to the emergent portion of said container for conducting therefrom heat given off by the condensation of said vaporized liquid;
   (g) a second substantially planar conductive member removably fastened to said first conductive member for conducting heat therefrom; and
   (h) a fluid-carrying conduit affixed to said second conductive member for removing heat therefrom and transporting the extracted heat.

2. A solar energy collection system according to claim 1 wherein said reflector comprises an arcuate member located within the space between said walls of said envelope.

3. A solar energy collection system according to claim 1 wherein said reflector comprises an inverted, elongate, substantially bilaterially symmetrical, gull-wing shaped member located within said envelope.

4. A solar energy collection system according to claim 1 wherein said envelope is partially reflectant.

5. A solar energy collection system according to claim 1 wherein said container includes a solar energy absorbing coating.

* * * * *